United States Patent [19]
Langne

[11] 3,899,019
[45] Aug. 12, 1975

[54] THREE-POSITION MOLDING MACHINE

[75] Inventor: Bengt I. Langne, Kewanee, Ill.

[73] Assignee: Acme-Cleveland Corporation, Cleveland, Ohio

[22] Filed: June 9, 1972

[21] Appl. No.: 261,434

[52] U.S. Cl. .............................. 164/201; 222/148
[51] Int. Cl. ........................................... B22c 15/24
[58] Field of Search .......................... 164/200–202, 164/22, 192, 158, 159; 222/160, 148; 214/18 PH, 59, 1 GD, 1 R; 425/258

[56] References Cited
UNITED STATES PATENTS

| 3,478,925 | 11/1969 | Austin et al. | 222/148 X |
| 3,528,481 | 9/1970 | Lund | 164/200 X |

FOREIGN PATENTS OR APPLICATIONS

| 694,798 | 9/1964 | Canada | 164/201 |

Primary Examiner—Robert D. Baldwin
Attorney, Agent, or Firm—Woodling, Krost, Granger & Rust

[57] ABSTRACT

A molding machine with a three-position mold material chamber is disclosed. The chamber is movable between first, second and third positions with the chamber filled at the second position and transferring the mold material into mold boxes at the first position. A third position outside the end of the frame is provided for cleaning out the chamber, such as at the end of the shift or at the end of the day. A novel fluid piston and cylinder connection is provided to move the chamber to this third position.

12 Claims, 10 Drawing Figures

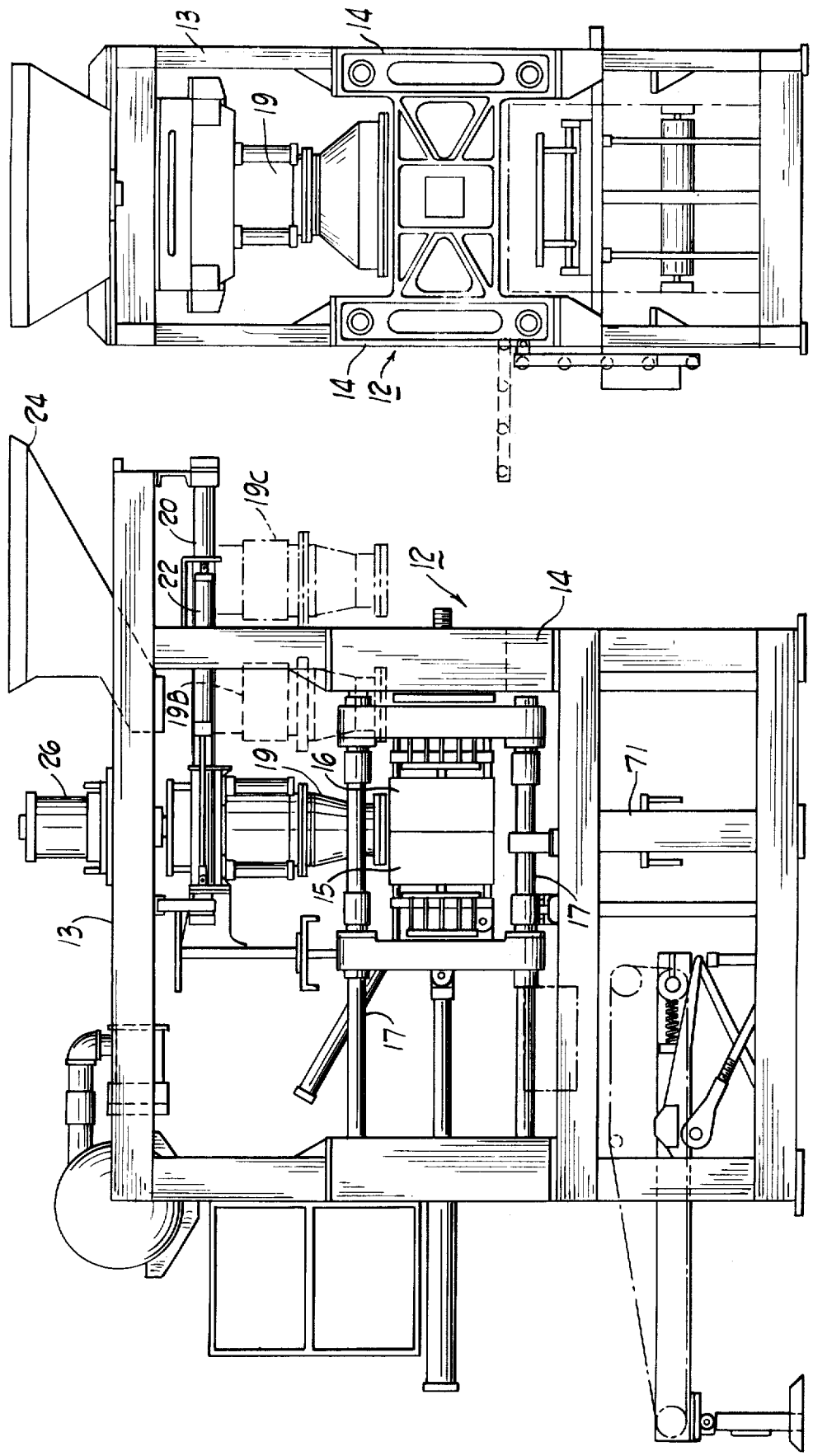

THREE-POSITION MOLDING MACHINE

BACKGROUND OF THE INVENTION

Molding machines have been manufactured with a mold material or sand transfer chamber which moves between first and second positions. The second position was that at which sand was transferred from a hopper into the transfer chamber and then the chamber moved to the first position whereat it would again be transferred into mold boxes. The molding machines may be such as to make what is called a mold or what is called a core, and in the present case either a mold or a core-making machine is contemplated. It has been known to have this sand transfer chamber movable on rollers or wheels moving on a track. The first position may be one which includes a clamp cylinder and a blow mechanism which blows or forces the sand from the sand transfer chamber into the mold boxes. The sand in a molding machine generally has some form of a binding agent therein, and in the last few decades a resin such as a thermosetting resin has come into increasing use as the binder. Where a thermosetting resin is used, then usually some form of heat is provided for the mold boxes to rapidly heat the sand and resin mixture to at least a partially cured condition so that the mold may be removed from the mold boxes. This means that stray heat is often present at the sand transfer chamber, despite means such as water cooling to keep the sand transfer chamber cool. At the end of the shift of workers or at the end of the day it is often desirable to completely empty the sand transfer chamber so that overnight the resin therein will not partially cure due to the retained heat and thus cause improper operation of the machine when next put into operation. Also it is often desired to change the type of resin or the fineness of the sand and hence under these conditions it is desired to empty the sand hopper and also the sand transfer chamber. The prior art method of emptying the sand transfer chamber was to dump the sand vertically downwardly by gravity when in the first position but with the mold boxes open. However, this had the disadvantage of dumping the sand into the confines of the machine whereat many parts of the machine became covered with the unwanted sand and resin. This created a problem for cleanup to get rid of this sand and resin mixture.

Accordingly, an object of the invention is to provide a molding machine and method which obviates the above-mentioned disadvantages.

Another object of the invention is to provide a molding machine wherein the sand transfer chamber is emptied at a third position completely outside an end of the frame.

Another object of the invention is to provide a method of moving the sand transfer chamber in a molding machine to a position outboard of an end of the frame for easy disposal of the sand and resin mixture within the sand transfer chamber.

Another object of the invention is to provide a molding machine with a fluid piston and cylinder having a limited stroke, which stroke is sufficient for moving the sand transfer chamber between first and second positions, and then disconnecting and refastening the piston and cylinder to move the chamber to a third position outside the frame of the machine.

SUMMARY OF THE INVENTION

The invention may be incorporated in a molding machine, comprising in combination, a frame, guide means on said frame having a horizontal component, a chamber mounted on said guide means for movement between first, second and third positions, fluid piston and cylinder means having extended and retracted relative conditions with one being a first condition and the other being a second condition, means to secure one end of said piston and cylinder means to act on the frame of the machine, means to fasten the other end of said piston and cylinder means to act on said chamber, fluid pressure means, control means controlling application of fluid pressure to said piston and cylinder means to relatively move same from the first to the second condition to move said chamber from the first to the second position, means to change the securing of said one end of the piston and cylinder means to a different position relative to said machine frame, and said control means being actuable to relatively move the piston and cylinder means to move said chamber from said second to said third position.

Other objects and a fuller understanding of the invention may be had by referring to the following description and claims, taken in conjunction with the accompanying drawing.

BRIEF DESCRIPTION OF THE DRAWINGS

FIG. 1 is a side elevational view of a machine embodying the invention;

FIG. 2 is an end view of the machine;

DESCRIPTION OF THE PREFERRED EMBODIMENT

Figure 3:
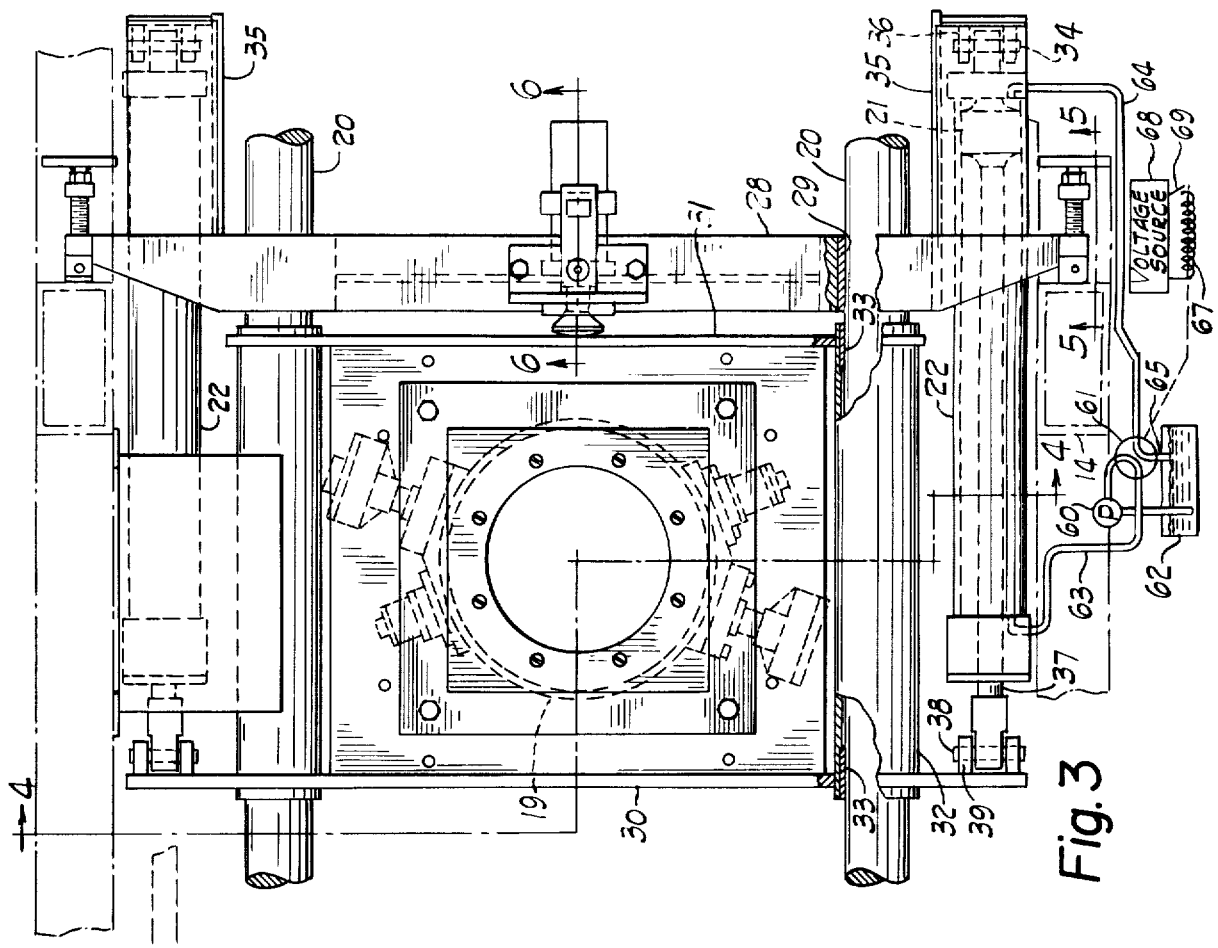
FIG. 3 is an enlarged partial top view of the sand transfer chamber.
Figure 4:
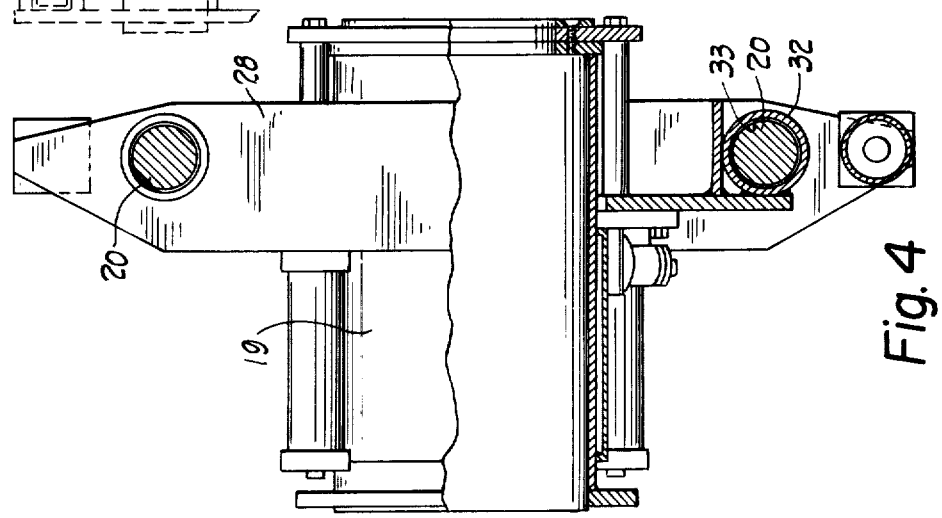
FIG. 4 is a sectional view on line 4—4 of FIG. 3.

FIGS. 1 and 2 illustrate a preferred embodiment of a molding machine 12 having a frame 13. Uprights 14 are provided at one end of this frame 13. Mold box means 15, 16 are provided on the frame 13, and in this preferred embodiment are mounted on guide rods 17 extending horizontally in the frame. The mold box means may be a single mold box but in this preferred embodiment includes two separate mold boxes reciprocable relative to each other along the guide rods 17 between open and closed positions. The closed position is shown in FIG. 1. The mold box means is designed to make either molds or cores, and in this application the word mold encompasses either type. After the completed sand and resin bonded mold is made, the mold boxes 15 and 16 relatively separate and the completed mold is removed by means which is not a part of the present invention.

A mold material chamber or transfer chamber 19 is movable on guide means 20. For convenience, the mold material may be referred to as sand, although it will be understood that this mold material generally includes a small proportion of a binder such as a thermosetting resin which is cured or partially cured by heat in the mold boxes 15, 16 to provide a completed mold. The guide means includes a horizontal component and in this preferred embodiment the guide means includes two parallel guide rods which are substantially horizontally fixed in the frame 13. Also in this preferred embodiment the guide rods 20 are substantially parallel to the guide rods 17. These guide rods guide and permit movement of the chamber 19 between first, second and third positions relative to the frame. The chamber 19 is shown in the first position in FIG. 1 with the second position 19B shown in phantom and a third position 19C also shown in phantom.

Fluid piston 21 and cylinder means 22 are provided to move the transfer chamber 19 on the guide rods 20. The transfer chamber may be moved to the second position 19B whereat it will be beneath a mold material supply means 24 in the form of a hopper. At this point the mold material may be discharged into the transfer chamber 19 and then the piston and cylinder means 22 may move the chamber 19 to the first position shown in full lines in FIG. 1. A clamp cylinder 26 is located vertically above this first position and may move downwardly to clamp the transfer chamber 19 downwardly against the closed mold boxes 15, 16. The transfer chamber 19 is resiliently supported to permit such slight downward movement against the mold boxes. With this transfer chamber 19 clamped in place, air pressure may be supplied at the top of the transfer chamber to blow the mold material into the closed mold boxes 15, 16, thus filling the cavity of the mold boxes with the molding material. The mold boxes may be provided with heat or other means to at least partially cure the binder of the mold material, and then the mold boxes may be separated so that the completed mold may be removed and the cycle repeated.

Figure 5:
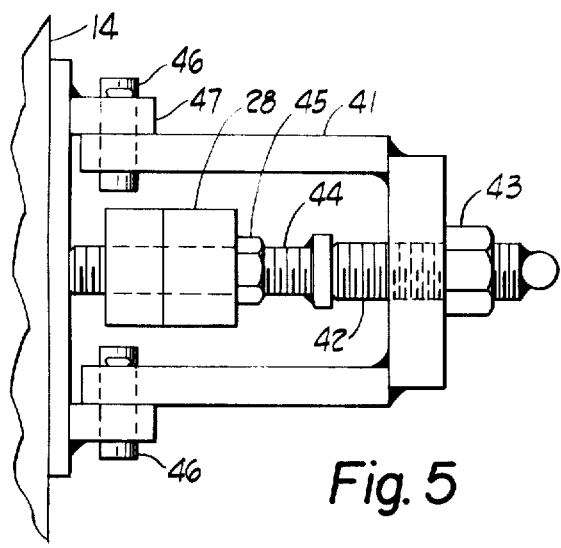
FIG. 5 is an enlarged sectional view on line 5—5 of FIG. 3.

The fluid piston and cylinder means 21, 22 is provided in the preferred embodiment by two such piston and cylinder units, one on each side of the transfer chamber 19. Both act in the same manner and hence in general only one will be described. The FIGS. 3–6 show in greater detail the construction of the piston and cylinder units and their connection to the transfer chamber 19. The piston and cylinder units have extended and retracted relative conditions with one being the first condition and the other being a second condition. The extended condition is as shown in FIG. 1 and the retracted condition is as shown in FIG. 3. Means is provided to secure one end of the piston and cylinder means to act on the frame of the machine. In the preferred embodiment this is provided by a shuttle 28 which has sleeve bearings 29 to be slidably journalled on the guide rods 20. The transfer chamber 19 is mounted on support arms 30, 31 between which extend a sleeve 32 with sleeve bearings 33 therein also journalled on the guide rods 20. Because of the weight and larger size of the sleeve bearings 33 compared to sleeve bearings 29, the transfer chamber 19 is much more difficult to move on the guide rods 20 than is the shuttle 28. The shuttle 28 has a rearwardly extending pair of arms 35 mounting a clevis 36 to which one end of the piston and cylinder means is secured by a pin 34. In the preferred embodiment this is one end of the cylinders 22 which is secured to the clevis 36. A piston rod 37 is connected to each piston 21 and thus this piston rod becomes the other end of the piston and cylinder means and is connected by a pin 38 to a clevis 39 on the support arm 30. There is means to secure the said one end of the piston and cylinder means to the frame upright 14. This is best illustrated in FIG. 5 wherein a U-bracket 41 threadably receives a clamping screw 42 which may be locked by a lock nut 43. Clamping screw 42 abuts another adjusting screw 44 which is threadably received in the end of the shuttle 28 and locked to it by a lock nut 45. Pins 46 are slidably received in holes in the end of the U-bracket 41 and also in a clevis 47 secured to the frame upright 14. These pins are held in by gravity and may be easily removed to remove the fastening of the U-bracket to the frame 13. The adjusting screw 44 permits a fine adjustment of the position of the chamber 19 relative to the frame 13 and especially relative to the closed or fill position of the mold boxes 15, 16.

Figure 6:
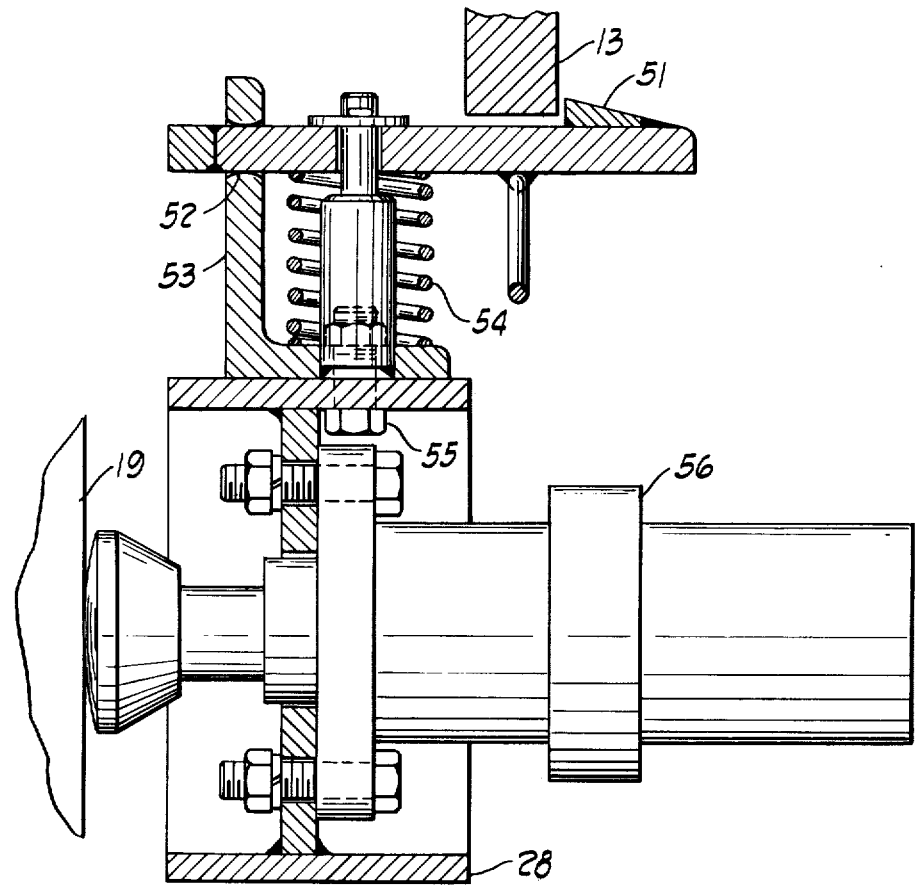
FIG. 6 is an enlarged sectional view on line 6—6 of FIG. 3.

The transfer chamber 19 may be moved to the third position 19C as shown in phantom in FIG. 1 and in this position a latch 51 is engageable with the frame 13 as shown in FIG. 6. The latch 51 is slightly movable in an aperture 52 in a bracket 53 attached to the shuttle 28. A spring 54 urges the latch 51 upwardly and a bolt and washer assembly 55 restrains the latch 51 from too high an elevation. As the shuttle 28 moves to the right as viewed in FIGS. 3 and 6 to the third position, then the sloping nose of the latch 51 will engage the frame 13 and compress the spring 54 until this latch 51 passes the frame and reaches the position shown in FIG. 6 whereupon the shuttle 28 will be latched to the frame 13. A shock absorber 56 may be mounted on the shuttle 28 in order to cushion the blow of the transfer chamber 19 as it is moved back to this third position.

FIG. 3 schematically illustrates a fluid pressure source 60 having an outlet connected to a four-way valve 61 and receiving fluid such as a liquid from a sump 62. The four-way valve 61 has an outlet conduit 63 connected to the left end of the cylinder means 22 and a conduit 64 connected to the right end of the cylinder means 22. Also the four-way valve has a discharge conduit 65 to the sump 62. The four-way valve may be actuated by a solenoid 67 energizable from a voltage source 68 and through a switch 69. The conduit connections are made from the four-way valve to both cylinders of the piston and cylinder means.

OPERATION

Figure 7:
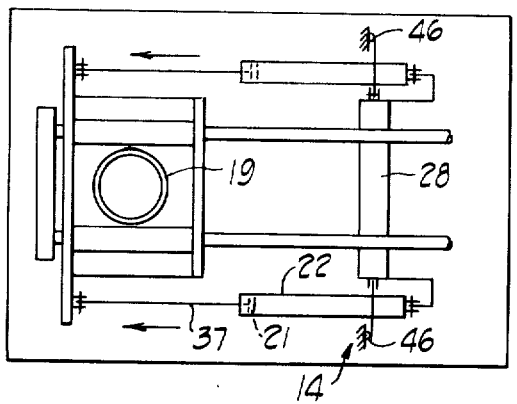
FIGS. 7, 8, 9 and 10 are schematic views of the sand transfer chamber illustrating a sequence of operation.
Figure 8:
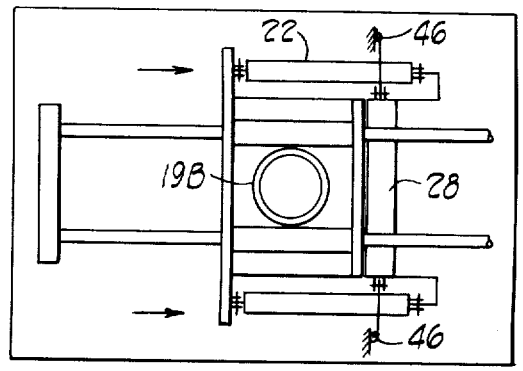

FIGS. 7 and 8 are diagrammatic representations of the blow position and fill position of the sand transfer chamber 19, which have previously been designated at the first and second positions, respectively. The transfer chamber 19 may be filled when in the second position 19B as shown in FIGS. 1 and 8. The fluid piston and cylinder means are in a retracted relative condition at this time. Next the control means may be actuated which can include the switch 69 to move the four-way valve 61 to the position opposite to that shown in FIG. 3. This applies fluid under pressure through the conduit 64 to the right end of cylinder 22 to move the piston 21 to the left. Accordingly the transfer chamber 19 moved to the position shown in full lines in FIGS. 1 and 7. In this position the clamp cylinder 26 is actuated to clamp the transfer chamber 19 downwardly on the closed mold boxes 15, 16. Air pressure is applied to the top of the blow head transfer chamber 19 to blow the mold material into the cavity of the mold boxes. These mold boxes have means such as heaters to at least partially cure the binder of the mold material, and then the mold boxes 15 and 16 may be relatively separated so that the completed mold may be removed. The mold boxes again close before mold material is again transferred into them. The transfer chamber 19 may then be moved again to the second position 19B to again be filled from the hopper 24.

This cycling back and forth between the first and second positions of the sand transfer chamber 19 is typical of the normal operation throughout one workman's shift, for example, and 8-hour day. At the end of the working day for that particular molding machine 11, it is usually desired to empty the sand transfer chamber 19 so that no molding material will remain therein and become hardened by any retained heat. In the prior art construction the sand transfer chamber had to be emptied down and onto all of the other machine components below. For example, the mold boxes 15,16 will be separated and the mold material with sand and binder will be dumped down through the machine. However, there might be a mandrel assembly 71 in the way and thus this would make clean out of the mold material quite difficult. The present invention provides a third position or transfer chamber clean out position 19C. This is illustrated in phantom lines in FIG. 1 and it will be seen that this position lies completely outside the uprights 14 of the frame 13. Accordingly with the mold material dumped when the chamber 19 is in this position, it may be dumped into a wheelbarrow, for example, to make easy cleanout and cleanup of the machine. The guide rods 20 are long enough to permit movement of the chamber 19 to this third position.

Figure 9:
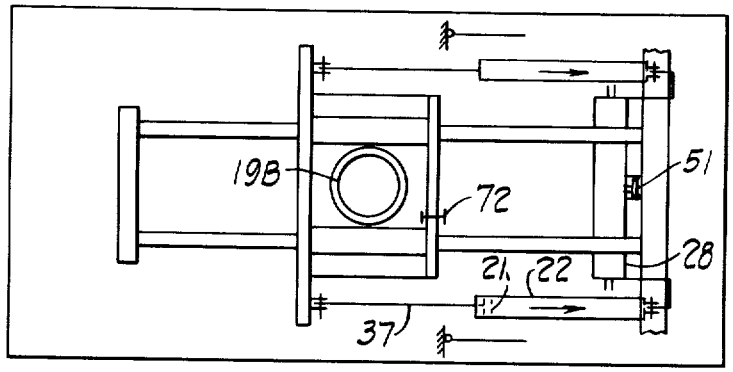

With the transfer chamber 19 in the second position 19B, then the clamp screw 42 is released to allow the U-bracket 41 to be swung sideways on pins 46 thereby releasing shuttle 28 from the frame 13. This releases the fastening of the one end of the piston and cylinder means to the frame 13. Because of the larger weight of chamber 19 relative to shuttle 28 and because of the larger bearing surfaces of sleeve bearings 33 compared with sleeve bearings 29, the transfer chamber 19 is much harder to move than the shuttle 28. With the U-bracket 41 clamped in place, the shuttle cannot move and hence this is a first resistance condition wherein the transfer chamber 19 is easier to move than the shuttle 28. Now with the U-bracket 41 swung to the side, this is a second resistance condition with the shuttle 28 being easier to move than the transfer chamber 19. The four-way valve 61 may be moved to the position alternate to that shown in FIG. 3, for example, by closing the switch 69. This applies fluid pressure through conduit 64 and the piston and cylinder means are relatively extended. This moves the shuttle 28 to the alternate position shown in FIG. 9. If the resistance to movement of the transfer chamber 19 is not sufficient a chamber latch 72 may be provided as shown in FIG. 9. When the shuttle 28 reaches the alternate position shown in FIG. 9, then the latch 51 automatically latches the shuttle 28 to the frame 13. Next the four-way valve 61 may be returned to the position shown in FIG. 3 as by opening the switch 69 and this applies pressure fluid through conduit 63 to again relatively retract the piston and cylinder means 21, 22. This pulls the transfer chamber 19 to the position shown in FIG. 10 which is the cleanout position 19C of this chamber. The transfer chamber may then be cleaned out by dumping the mold material therein.

Figure 10:
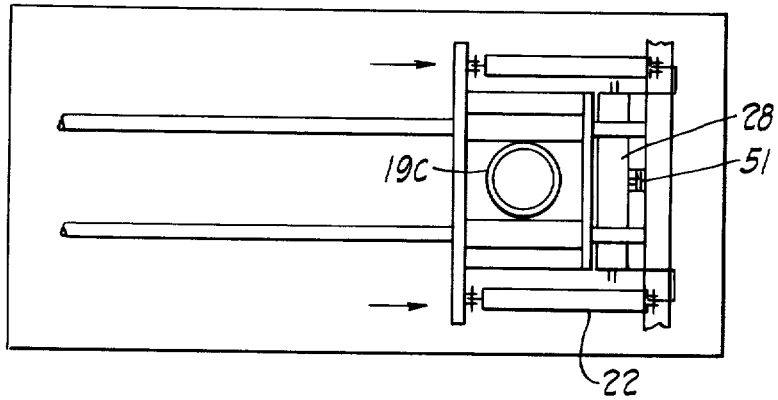

To return the transfer chamber 19 to operation, when in the position shown in FIG. 10, the four-way valve 61 may be actuated to the position opposite that shown in FIG. 3. This relatively extends the piston and cylinder means 21, 22 to move the transfer chamber 19 from the position of FIG. 10 to the position of FIG. 9. Next the latch 51 may be manually released and the four-way valve 61 returned to the position shown in FIG. 3. This supplies fluid under pressure to conduit 63 to relatively retract the piston and cylinder means 21, 22. This moves the shuttle 28 from the position of FIG. 9 to the position of FIG. 8. In this position the U-bracket 41 may be swung on the pins 46 and the clamp screw 42 tightened against the adjusting screw 44 to latch or clamp the shuttle 28 to the frame 13. Also if the hopper 24 contains mold material which is desired to be removed, the transfer chamber 19 may be moved back and forth between the second and third positions to shuttle such old material to the cleanout position 19C and thus empty the hopper. This may be desirable where a change in the constituents of such mold material is desired.

The present machine and method of operation permits a relatively short piston and cylinder assembly to move the transfer chamber 19 through a movement which exceeds the stroke of the piston and cylinder assembly. For example, if a machine requires a 24-inch stroke between the first and second positions of the transfer chamber 19, and also requires about a 24-inch stroke to move from the second to the third position, then in the prior art mode this would mean a piston and cylinder assembly with about a 48-inch stroke and a total length of about 100 inches when extended. This would be more expensive than a 24-inch stroke piston and cylinder assembly and also require more room for mounting on the machine. Further the stroke would be only about 24 inches for much of the 8-hour day, shuttling the transfer chamber back and forth between the first and second positions. The remaining 24 inches of the stroke would normally be unused during the 8 hour day yet the piston rods would be exposed for the first 24 inches of their length to the heat and abrasive qualities of the sand or other mold material in the environment of the molding machine 11. This could means still further cost in providing flexible boots or other protective shields for the piston rods. The present method of operation means that the stroke of the piston and cylinder means may be no longer than that required for the shuttling between the first and second positions, yet by changing the securing of the one end of the piston and cylinder to the frame, see the transition between FIGS. 8 and 9, the transfer chamber may be moved to the clean-out third position of FIG. 10. All this may be accomplished without using a long stroke piston and cylinder.

Also, it has been common to transfer a machine section between two positions by suspending it from a roller track or wheels and use an air or hydraulic cylinder or other mechanical means to transfer the section between the two positions. In the present machine the transfer chamber is supported on heavy guide rods for rigidity and precision positioning. Because of the weight and friction of the transfer chamber 19 it cannot be moved manually to the cleanout position 19C, yet the fluid power means 21, 22 permits ready movement to this cleanout position.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A molding machine, comprising in combination, a frame,
    mold box means having a fill position,
    guide means on said frame having a horizontal component,
    a chamber mounted on said guide means for movement between first, second and third positions,
    means to supply mold material into said chamber with the chamber in said second position thereof,
    means to transfer a charge of mold material from said chamber into said mold box means at said fill position with said chamber in said first position thereof,
    and means to move said chamber among said three positions including fluid piston and cylinder means having extended and retracted relative conditions with one being a first condition and the other being a second condition,
    means to secure one end of said piston and cylinder means to act on the frame of the machine,
    means to fasten the other end of said piston and cylinder means to act on said chamber,
    fluid pressure means,
    control means controlling application of fluid pressure to said piston and cylinder means to relatively move same from the first to the second condition to move said chamber from the first to the second position,
    means to change the securing of said one end of the piston and cylinder means to a different position relative to said machine frame,
    and said control means being actuable to relatively move the piston and cylinder means to move said chamber from said second to said third position.

2. A molding machine as set forth in claim 1, wherein said means to change the securing of said one end includes said control means controlling movement of said piston and cylinder means to said first condition.

3. A molding machine as set forth in claim 1, wherein said means to change the securing of said one end includes a shuttle movable on said guide means with said one end acting thereon,
    and means fastening the shuttle temporarily fixed relative to said frame.

4. A molding machine as set forth in claim 1, wherein said means to change the securing of said one end includes a shuttle movable on said guide means with said one end acting thereon,
    said securing means establishing a first resistance condition of said chamber with said chamber easier to move on said guide means than said shuttle,
    and said changing means establishing a second resistance condition with said shuttle easier to move on said guide means than said chamber.

5. A molding machine as set forth in claim 4, wherein said first resistance condition is established by said securing means removably clamping the shuttle to said frame.

6. A molding machine as set forth in claim 4, wherein said changing means establishing said second resistance condition includes means mounting said chamber on said guide means with a friction therebetween of a first amount,
    and means mounting said shuttle on said guide means with a second amount of friction therebetween which is less than said first amount of friction.

7. A molding machine to shape a forming surface comprising, in combination,
    a frame having an end,
    mold box means having a fill position,
    guide means with a horizontal component on said frame,
    a mold material chamber movable on said guide means between first and second positions,
    mold material supply means to supply mold material into said chamber with the chamber in said second position thereof,
    means to move said chamber from said second to said first position adjacent said fill position of said mold box means,
    means to transfer a charge of mold material from said chamber into said mold box means to shape a forming surface,
    said first and second positions of said chamber lying entirely within said frame,
    an extension on said guide means to lie outside said end of said frame to establish said chamber being movable on said guide means to a third position outboard of said end of said frame whereat said transfer means may be actuated to empty any mold material from said chamber downwardly to a position lying completely outside said frame,
    said means to move said chamber including;
    fluid piston and cylinder means having extended and retracted relative conditions with one being a first condition and the other being a second condition,
    means to secure one end of said piston and cylinder means to act on the frame of the machine,
    means to fasten the other end of said piston and cylinder means to act on said chamber,
    fluid pressure means,
    control means controlling application of fluid pressure to said piston and cylinder means to relatively move same from the first to the second condition to move said chamber from the first to the second position,
    means to change the securing of said one end of the piston and cylinder means to a different position relative to said machine frame,
    and said control means being actuable to relatively move the piston and cylinder means to move said chamber from said second to said third position.

8. A molding machine as set forth in claim 7, wherein said means to change the securing of said one end includes said control means controlling movement of said piston and cylinder means to said first condition.

9. A molding machine as set forth in claim 7, wherein said means to change the securing of said one end includes a shuttle movable on said guide means with said one end acting thereon,
    and means fastening the shuttle temporarily fixed relative to said frame.

10. A molding machine as set forth in claim 7, wherein said means to change the securing of said one end includes a shuttle movable on said guide means with said one end acting thereon, said securing means establishing a first resistance condition of said chamber with said chamber easier to move on said guide means than said shuttle, and said changing means establishing a second resistance condition with said shuttle easier to move on said guide means than said chamber.

11. A molding machine as set forth in claim 10, wherein said first resistance condition is established by said securing means removably clamping the shuttle to said frame.

12. A molding machine as set forth in claim 10, wherein said changing means establishing said second resistance condition includes means mounting said chamber on said guide means with a friction therebetween of a first amount, and means mounting said shuttle on said guide means with a second amount of friction therebetween which is less than said first amount of friction.

* * * * *